(No Model.)
C. F. BRUSH.
COMMUTATOR COLLECTOR OR BLOCK FOR DYNAMO ELECTRIC MACHINES.
No. 428,742. Patented May 27, 1890.
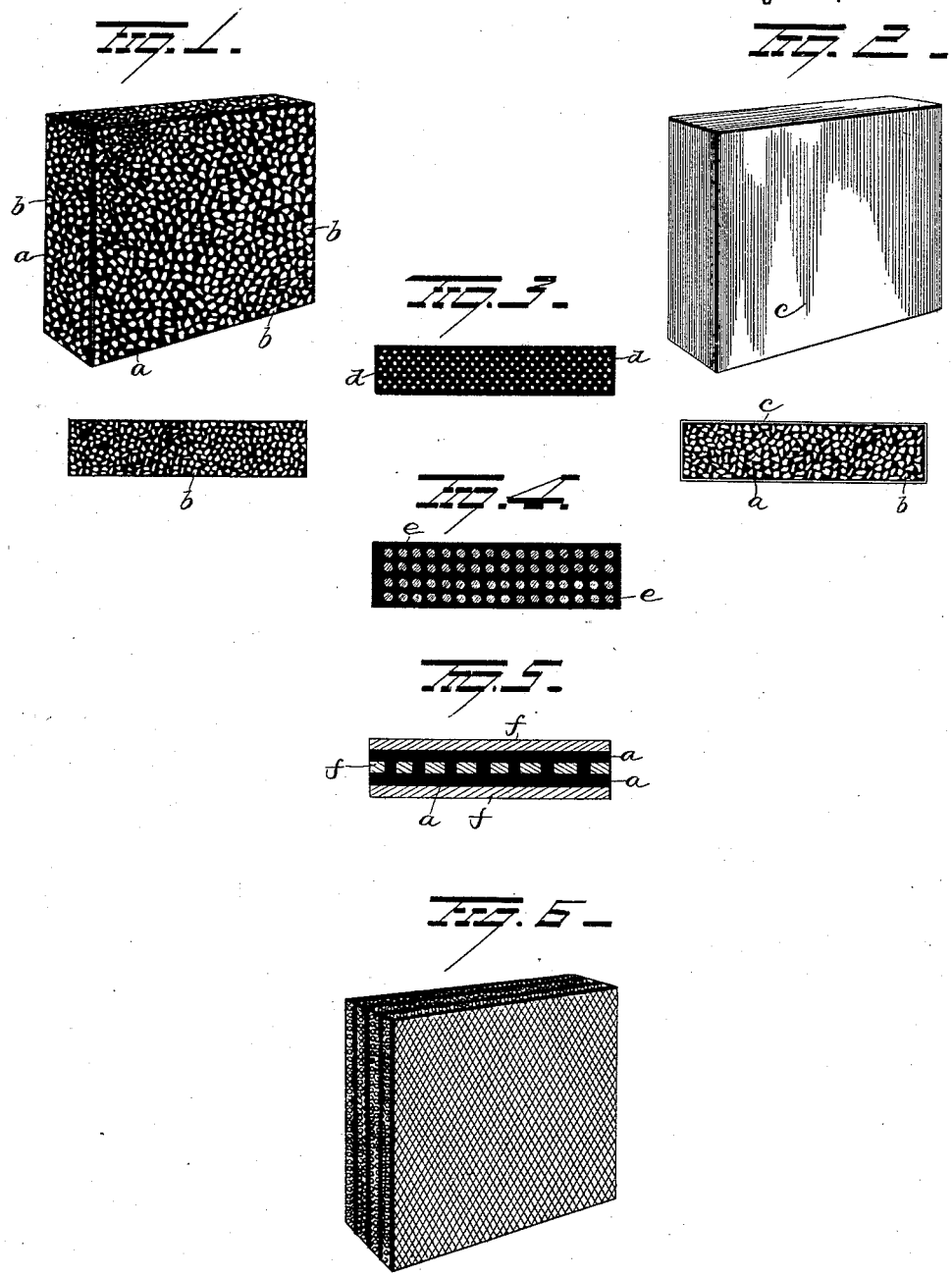

United States Patent Office.

CHARLES F. BRUSH, OF CLEVELAND, OHIO.

COMMUTATOR COLLECTOR OR BLOCK FOR DYNAMO-ELECTRIC MACHINES.

SPECIFICATION forming part of Letters Patent No. 428,742, dated May 27, 1890.

Application filed November 22, 1889. Serial No. 331,197. (No model.)

*To all whom it may concern:*

Be it known that I, CHARLES F. BRUSH, a resident of Cleveland, in the county of Cuyahoga and State of Ohio, have invented certain new and useful Improvements in Commutator-Current Collectors or Blocks for Dynamo-Electric Machines or Electric Motors; and I do hereby declare the following to be a full, clear, and exact description of the invention, such as will enable others skilled in the art to which it appertains to make and use the same.

My invention relates to an improvement in commutator-current collectors or blocks for dynamo-electric machines or motors.

Heretofore attempts have been made to substitute current collectors or blocks made of carbon or carbon and graphite for the copper brushes commonly used; but collectors thus made were found objectionable and defective, owing to their low electrical conductivity and consequent excessive heating when in use.

The object of my invention is to provide a commutator-current collector or block having an electrical conductivity sufficiently high to prevent it from becoming unduly heated when in use and of such form and material as will insure an extended and intimate contact with the commutator and be capable of long continued use without renewal.

With these ends in view my invention consists in a commutator-current collector or block consisting of carbon and metal of good electrical conductivity intimately associated and combined together.

The invention further consists in a commutator-current collector composed of carbon and metal molded into the desired form.

It further consists in a current-collector composed of carbon having finely-divided metal distributed through its mass.

It further consists in a current-collector made of carbon, graphite, and metal.

It further consists in a current-collector made of carbon and metal molded into the desired form and electroplated.

It further consists in certain other features of invention and improvement, as will be hereinafter described, and pointed out in the claims.

In the accompanying drawings, Figure 1 represents a commutator-current collector or block composed of carbon having finely-divided metal distributed throughout its mass. Fig. 2 shows the collector or block provided with an electroplated coating. Figs. 3, 4, 5, and 6 illustrate modifications.

In the manufacture of commutator-current collectors or blocks I take finely divided or pulverized carbon in the form of coke and finely divided or pulverized suboxide of copper, together with a sufficient quantity of pitch or other suitable hydrocarbon, which serves as a binder, and, after thoroughly mixing the mass, mold it in any desired shape or form by placing the mixture in a suitable mold, and subjecting it while in a heated state to great pressure, thereby imparting the desired density and hardness to the completed article and insuring an intimate union of the material of which it is composed. The article after being molded is packed in sand and baked a sufficient length of time to render it hard and suitable for the purpose intended. The operation of baking the collectors or blocks serves to reduce the suboxide of copper to metallic copper, which, being in intimate contact with the carbon and distributed throughout its mass, imparts a sufficiently high electrical conductivity to the article to prevent it from becoming excessively heated when in use. The process of baking renders the block slightly porous, and exposes to the atmosphere the particles of metallic copper located at or near the surface of the block. To solidify the block and protect the particles of metal so exposed, I submerge the block, after baking, in a hot bath of paraffine or equivalent material, which serves to fill the pores, expel the air or any moisture contained therein, and to thoroughly coat and protect the surface of the block.

The relative proportions of the suboxide of copper and carbon which I have found well suited for the purpose are seventy-five per cent. of suboxide of copper, ten per cent. of carbon, and fifteen per cent. of pitch or other equivalent binding material, although these proportions may be widely varied and still insure the production of a greatly-improved article.

Instead of using suboxide of copper, I may use other metallic oxides, or copper or other suitable metals in a finely-divided metallic, state may be mixed with the carbon and molded into form.

Again, instead of using a mixture consisting of carbon in the form of pulverized coke and metal in a finely-divided state, I also use pulverized coke and graphite mixed with finely-divided metal, and thereby obtain the lubricating qualities of the graphite for lessening the wear of the collector and the commutator segments.

After the collector or block has been molded, as described, it may be electroplated with copper, if desired. Fig. 1 shows a collector or block, in which $a$ represents the carbon—either pulverized coke or coke and graphite—and $b$ the finely-divided copper or other metal distributed throughout its mass. In Fig. 2 the block is provided with an electroplated coating $c$ of copper, which serves to increase the strength and electrical conductivity of the block and insures its good electrical contact with the clamp to which it is secured when in use.

Instead of using finely-divided metal distributed throughout the carbon, I may use fine wires of copper or other metal molded parallel to each other in the block, so that in use the latter may be secured in the clamp in such manner that the wires will form electric conductors between the clamp and commutator. This form of collector is illustrated in Fig. 3, $d$ representing the wires and $a$ the carbon, whether composed of coke or coke and graphite. Again, instead of using fine wires, as illustrated in Fig. 3, I may employ rods $e$, either round or square, as illustrated in Fig. 4.

Another modification is represented in Fig. 5, in which $f$ represents alternate plates or sheets of copper or other metal, which may be perforated, if desired, and $a$ the layers of carbon.

Fig. 6 shows a block composed of several layers of metal gauze, around and into which the carbon is pressed. The wires composing the gauze are disposed diagonally, as shown, and thus the wearing away of the block continually presents the ends of these wires at new points on the commutator, thus preventing unequal wearing.

It is evident from the foregoing description that the form and construction of my improved commutator-current collector or block may be widely varied, and that the proportions of the mixture of materials and the materials constituting the mixture or combination may also be varied without departing from the invention, and hence I would have it understood that I do not limit the invention to the particular construction of commutator-block shown or described, or to the particular proportions of materials specified; but, Having fully described my invention, what I claim as new, and desire to secure by Letters Patent, is—

1. A commutator-current collector or block consisting of carbon and interspersed metal, substantially as and for the purpose specified.

2. A commutator-current collector or block consisting of carbon and interspersed metal molded into the desired form, substantially as and for the purpose specified.

3. A commutator-current collector or block consisting of carbon having finely-divided metal distributed throughout its mass, substantially as and for the purpose specified.

4. A commutator-current collector or block consisting of carbon having finely-divided copper distributed throughout its mass, substantially as and for the purpose specified.

5. A commutator-current collector or block consisting of carbon and metal molded together and provided with an electroplated coating, substantially as and for the purpose specified.

6. A commutator-current collector or block consisting of carbon, graphite, and metal molded and compressed into the desired form, substantially as and for the purpose specified.

7. A commutator-current collector or block consisting of a mass of molded and compressed carbon and metal of good electrical conductivity, substantially as and for the purpose specified.

In testimony whereof I have signed this specification in the presence of two subscribing witnesses.

CHARLES F. BRUSH.

Witnesses:
J. POTTER,
SIDNEY H. SHORT.